United States Patent [19]

Lisson

[11] Patent Number: 4,846,575

[45] Date of Patent: Jul. 11, 1989

[54] DEVICE AND METHOD FOR MONITORING ALIGNMENT UTILIZING PHASE CONJUGATION

[75] Inventor: Jerold B. Lisson, Henrietta, N.Y.

[73] Assignee: Eastman Kodak Company, Rochester, N.Y.

[21] Appl. No.: 108,254

[22] Filed: Oct. 13, 1987

[51] Int. Cl.[4] .............................................. G01B 9/02
[52] U.S. Cl. .................................... 356/363; 356/153
[58] Field of Search ....................... 356/345, 363, 153

[56] References Cited

U.S. PATENT DOCUMENTS

| | | | |
|---|---|---|---|
| 3,729,260 | 4/1973 | Walsh | 356/363 |
| 3,844,660 | 10/1974 | Hunter | 356/363 X |
| 4,280,764 | 7/1981 | Sica, Jr. et al. | 356/35.5 |
| 4,529,273 | 7/1985 | Cronin-Golomb et al. | 350/354 |
| 4,640,618 | 2/1987 | Tracy et al. | 356/345 |
| 4,681,446 | 7/1987 | Yeh | 356/350 |

OTHER PUBLICATIONS

V. V. Shkunov and B. Y. Zel'dovich, *Optical Phase Conjugation*, Scientific American, pp. 54–59 (Dec. 1985).

D. M. Pepper, *Applications of Optical Phase Conjugation*, Scientific American, pp. 74–83 (Jan. 1986).

I. Lindsay and J. C. Dainty, *Partial Cancellation of Specular Refraction in the Presence of a Phase-Conjugate Mirror, Optics Communications,* vol. 59, No. 5, 6, pp. 405–410 (1 Oct. 1986).

*Primary Examiner*—Davis L. Willis
*Assistant Examiner*—Matthew W. Koren
*Attorney, Agent, or Firm*—Stephen C. Kaufman

[57] ABSTRACT

Monitoring alignment of an element(s) is accomplished with a source of radiation (11), an alignment reflecting assembly (12) embedded within or attached to an element (13) whose alignment is to be monitored and a detection assembly (14). Alignment reflecting assembly (12) includes a conventional mirror (16) that reflects a portion of the incident radiation (E) at a reflection angle that is substantially equal in magnitude and opposite in sign to that of the angle at which the incident radiation is incident thereupon. Alignment reflecting assembly (12) also includes a phase conjugate mirror (18) that reflects incident radiation (E) at a reflection angle that is substantially equal in magnitude and sign to that of the angle at which the incident radiation is incident thereupon, i.e., along the path of the incident radiation. The alignment orientation of alignment reflecting assembly (12) and element (13) is determined by monitoring the so-called retro-reflected radiation from the phase conjugate mirror (18) and the reflected radiation from the conventional mirror (16).

38 Claims, 2 Drawing Sheets

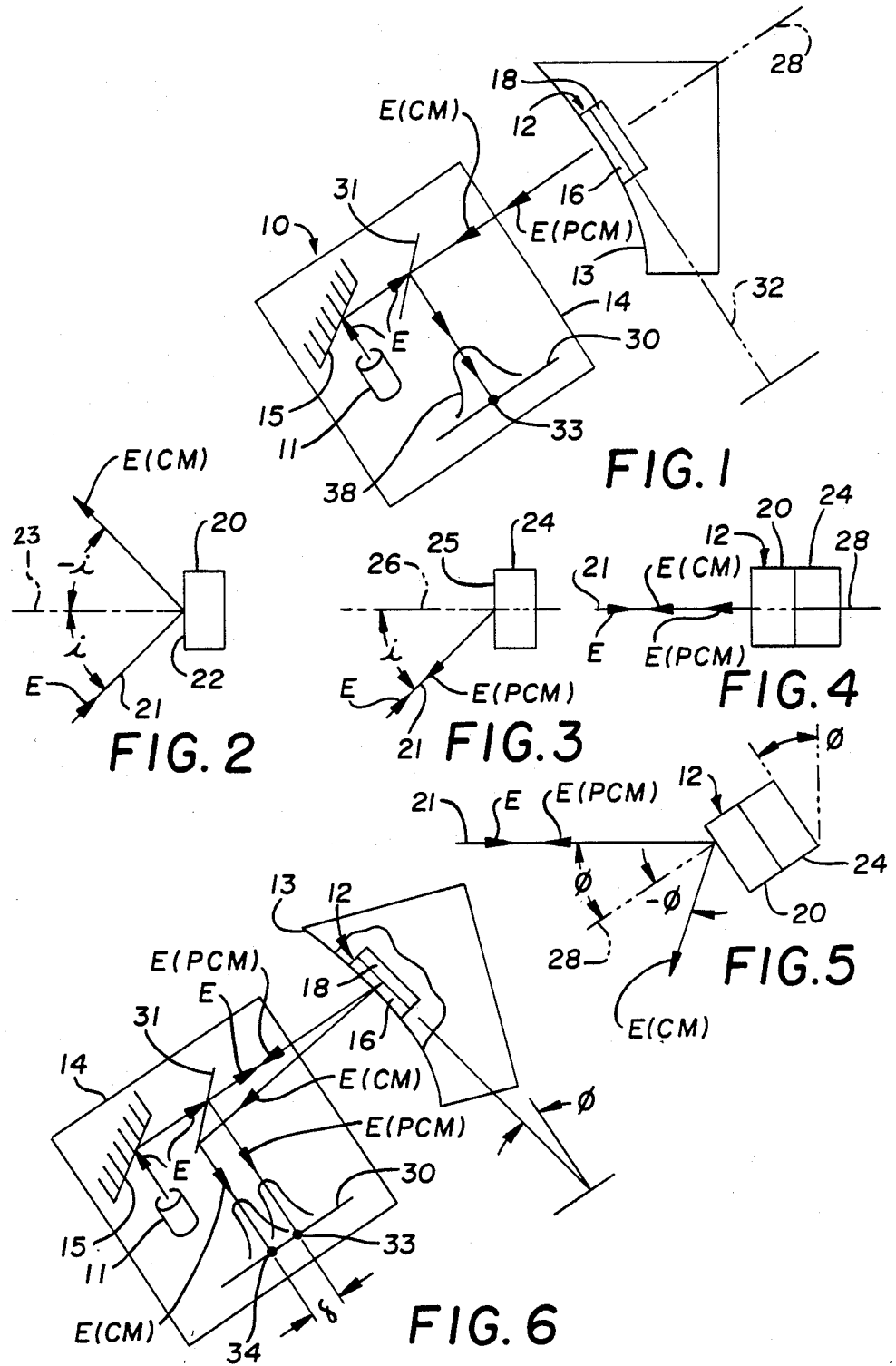

DEVICE AND METHOD FOR MONITORING ALIGNMENT UTILIZING PHASE CONJUGATION

TECHNICAL FIELD

The present invention relates generally to sensing alignment of an element. More particularly, the present invention relates to monitoring alignment of elements using both linear and non-linear reflectors. Still more specifically, the present invention relates to use of electromagnetic radiation, such as light, to monitor the alignment of the desired elements, such as optical components.

BACKGROUND ART

High accuracy and precision alignment is highly desirable or essential in innumerable fields of endeavor. Many techniques for attempting such alignment are known. For example, a number of techniques for various applications monitor the position of one or more reflections off the object(s) to be alignment to determine alignment. However, heretofore these reflections obeyed the principal that the angle of reflection (arbitrarily defined as being in a positive direction from the normal to the object's surface) was equal to the angle of incidence but in the negative direction to the normal. As a result, these techniques generally had to utilize complicated and costly schemes that yielded alignment information whose accuracy and precision was limited.

I have found a device and method for alignment employing a relatively recently discovered class of materials known as phase conjugators. Phase conjugate materials provide reflection along the incident path. (A good discussion of phase conjugation and materials exhibiting such properties in the optical region of the electromagnetic spectrum is furnished in the article by Shkunov and Zel'dovich, *Optical Phase Conjugation, Scientific American*, pp. 54–59 Dec. 1985))

Phase conjugation has been shown to be useful for several applications, particularly in the optical region of the electromagnetic spectrum, as explained in the article by Peper, *Applications of Optical Phase Conjugation, Scientific American*, pp. 74–83, (Jan. 1986). Perhaps the most common application has been to correct distortions arising in a coherent light beam as the beam lases in an optical cavity. U.S. Pat. No. 4,529,273 and the article by Lindsay and Dainty, *Partial Cancellation of Specular Refraction in the Presence of a Phase-Conjugate Mirror, Optics Communications*, Vol. 59, No. 5,6, pp. 405–410 (Oct. 1, 1986), both disclose so-called phase conjugate reflector or phase conjugate mirror ("PCM") configurations for correction of these optical distortions.

Optical phase conjugators may also be used to construct optical inertial navigation sensors such as the gyroscope described in U.S. Pat. No. 4,681,446 and the accelerometer described in U.S. Pat. No. 4,640,618, and to construct an optical interferometer for determination of surface deformations as described in U.S. Pat. No. 4,280,764. None of these patents or the previously mentioned articles illustrate or suggest using PCMs in configurations and with methods that yield highly accurate and precise alignment information.

SUMMARY OF INVENTION

It is, therefore, an object of the invention to provide a device and method for monitoring alignment accurately and precisely using radiation reflected from phase conjugate material.

It is another object of the invention to provide a device and method for monitoring alignment, as above, in which alignment is monitored for all radiation patterns.

It is still another object of the invention to provide a device and method for monitoring alignment, as above, in which the sensitivity to alignment variations is readily selectable and is great for small misalignments.

It is yet another object of the invention to provide a device and method for monitoring alignment, as above, in which alignment perturbations within the device itself does not effect monitored alignment accuracy or precision.

It is a further object of the invention to provide a device and method for monitoring alignment, as above, in which variations in alignment may be dynamically monitored, permitting dynamic correction to misalignment conditions.

It is still a further object of the invention to provive a device and method for monitoring alignment, as above, in which the characteristics of the alignment monitoring signal are readily tailored to the application.

These and other objects and advantages of the present invention over existing prior art forms will become more apparent and fully understood from the following description in conjunction with the accompanying drawings.

In general, device utilizing radiation for monitoring alignment of elements includes two elements for reflecting at least a portion of the radiation incident thereupon at a first incident angle and a second incident angle, respectively. The first element reflects incident radiation at a first reflection angle different from the first incident angle. The second element reflects incident radiation at a second reflection angle substantially equal to the second incident angle. A detector receives the radiation reflected from the first element and the radiation reflected from the second element and generates at least one signal indicative of the alignment of the first element and the second element.

A method utilizing radiation for monitoring alignment of elements, includes the steps of reflecting at least a portion of the radiation incident upon a first element at a first reflection angle different from the first incident angle, reflecting at least a portion of the radiation incident upon a second element at a second reflection angle substantially equal to the second incident angle and, determining alignment of the first element and the second element from the radiation reflected from the first element and the radiation reflected from the second element.

BRIEF DESCRIPTION OF THE DRAWINGS

FIG. 1 is a schematic diagram of an exemplary device, which embodies an exemplary method, in accordance with the concepts of the present invention, including a source or radiation, an alignment reflecting assembly attached to an element whose alignment is to be monitored and a detection assembly. In FIG. 1 the element is shown in complete alignment. An exemplary output from the detection assembly is also shown.

FIG. 2 is a schematic diagram of a conventional reflector (hereinafter called "conventional mirror" or "CM"), depicting reflection of radiation incident upon the CM surface at a positive angle i relative to the normal to the CM surface. The radiation reflected from the CM surface is reflected at an angle relative to the normal equal to but in the negative direction from the normal (−i), in accordance with well-known principal. (Unless otherwise noted all angles referred to hereinafter shall be taken relative to the normal to the surface being discussed.)

FIG. 3 is a schematic diagram of a phase conjugate reflector (hereinafter called "phase conjugate mirror" or "PCM"), depicting reflection of incident radiation at an angle substantially equal to the angle of the incident radiation.

FIG. 4 is a schematic diagram of an exemplary alignment reflecting assembly, depicting reflection of incident radiation where such radiation is incident substantially normal to the surface of the alignment reflecting assembly (i.e., when the incident angle is zero degrees).

FIG. 5 is a schematic diagram of the exemplary alignment reflecting assembly shown in FIG. 4 misaligned by counterclockwise rotation by an angle of phi degrees ($\phi°$), depicting reflection of incident radiation where such radiation is incident at an angle of phi degrees ($\phi°$).

FIG. 6 is a schematic diagram of the exemplary device shown in FIG. 1 in which the monitored element is misaligned by a counterclockwise rotation by an angle of phi degrees ($\phi°$).

DESCRIPTION OF AN EXEMPLARY EMBODIMENT

Figures 7, 8, 9:
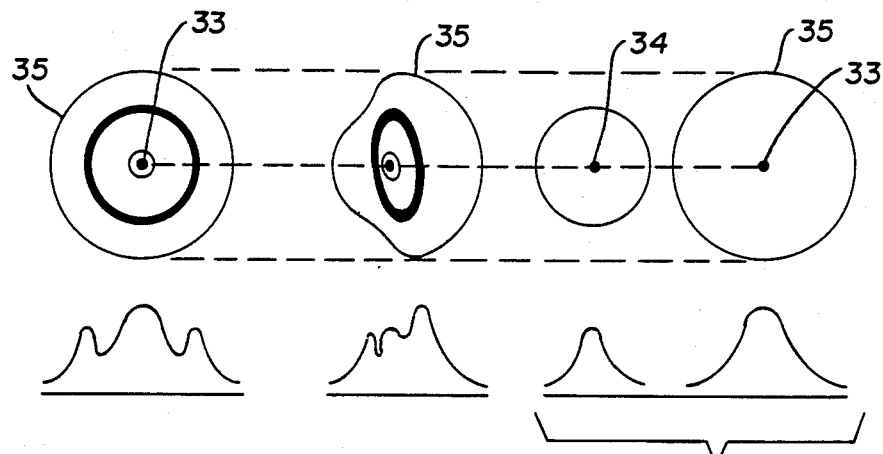
FIG. 7 is a top view and an elevational view through the center of the top view of the radiation reflected upon the detector array when the exemplary device of FIG. 1 is in alignment as shown in FIG. 1.
FIG. 8 is a top view and an elevational view through the center of the top view of the radiation reflected upon the detector array when their exists a small misalignment in the element monitored by the exemplary device of FIG. 1.
FIG. 9 is a top view and an elevational view through the center of the top view of the radiation reflected upon the detector array when their exists a large misalignment in the element monitored by the exemplary device of FIG. 1.

FIG. 1 depicts in schematic diagram form an exemplary device, generally indicated by the numeral 10, which embodies an exemplary method, in accordance with the concepts of the present invention, including a source of radiation 11, an alignment reflecting assembly 12 embedded within or attached to an element 13 whose alignment is to be monitored and a detection assembly Referring source 11 may be source of radiation suitable to achieve the reflections described more fully hereinafter. One implementation of device 10 that has been found convenient and suitable for a variety of applications employs radiation in the optical region of the electromagnetic spectrum. In this instance radiation source 11 may be any conventional laser, although it is preferable in many applications to use a laser having a high energy output such as an argon-ion laser operating at a wavelength of 5145 Angstroms. For other embodiments of device 10 other energy or radiation may be desirable, such as without limitation acoustical energy, infrared energy or microwave radiation. As would occur to the ordinarily skilled artisan, the source energy or radiation may be conventionally conditioned and directed to the alignment reflection assembly 12. Where radiation source 11 is an laser, the laser beam may, for example, be passed through polarizers and filters (not shown) and redirected by a fold mirror 15.

Alignment reflecting assembly 12 includes a CM 16 and a PCM 18 in operative association, and is affixed to or embedded within element 13 by any suitable means for insuring a fixed alignment with alignment reflecting assembly 12. In order to more fully appreciate the nature of the operative association between CM 16 and PCM 18 and the operation of alignment reflecting assembly 12, reference is made to FIGS. 2 through 5.

FIG 2 presents a CM 20 where radiation 21 incident upon the CM reflecting surface 22 at a positive angle i relative to the normal 23 of the CM reflecting surface 22 is reflected at a reflection angle −i substantially equal in magnitude and opposite in sign to that of the incident angle i. CM 20 may be any reflector that reflects incident radiation in this manner.

In FIG. 3 a PCM 24 can be seen to reflect radiation 21 incident upon the PCM reflecting surface 25 at a positive angle relative to the normal 26 of the PCM reflecting surface 25 at a reflection angle i that is substantially equal in both magnitude and sign to that of the incident angle i. In other words, PCM 24 reflects radiation back substantially along the path of the radiation incident thereupon, a phenomenon known as retro-reflection. PCM 24 may be any reflector that reflects incident radiation by retro-reflection (such as a substrate of barium titanate).

A combination of CM 20 and PCM 24 forming one possible exemplary embodiment of an alignment reflecting assembly 12 is illustrated in FIGS 4 and 5. A partially transmissive CM 20 and PCM 24 have been positioned proximate each other such that radiation 21 incident upon alignment reflecting assembly 12 along its normal 28 will be retro-reflected by both CM 20 and PCM 24. If, solely by way of example, CM 20 is approximately 70 percent transmissive of radiation and PCM 24 has a reflectance of approximately 30 percent, then the reflected radiation energy from CM 20, identified as E(CM), will equal (1−0.7) times the incident radiation energy E and the reflected radiation energy from PCM 24 will equal the product of $0.7 \times 0.3 \times E$.

In FIG. 5 alignment reflecting assembly 12 has been rotated counterclockwise by a tilt angle of $\phi$ degrees relative to the path of the incident radiation. As explained above, PCM 24 will retro-reflect a portion of the incident radiation along the path of the incident radiation while CM 20 will reflect a portion of the incident radiation at an angle from the normal 28 equal in magnitude and opposite in sign to the angle at which the radiation is now incident (i.e., twice the tilt angle where the magnitude of the incident angle equals the magnitude of the tilt angle). Thus, by simply monitoring the difference between the retro-reflected radiation from PCM 24 and the reflected radiation from CM 20 and applying elementary trigonometry, the orientation of alignment reflecting assembly 12 may be highly accurately and precisely monitored. This also provides highly accurate and precise monitoring of the orientation of any element(s) to which alignment reflecting assembly 12 is affixed.

Returning to FIG. 1, detection assembly 14 can be seen to include a detector array 30 and a conventional beam splitter 31 adequate to direct the radiation reflected from alignment reflecting assembly 12. Detector array 30 may be any conventional detector array suitable for generating a signal at least one characteristic of which (such as voltage or current) is indicative of the characteristic of the reflected radiation selected to be monitored. Where device 10 is to operate in the optical region of the electromagnetic spectrum and radiation source 11 is a laser, a conventional CCD array may be chosen as detector array 30 and the intensity of the reflected light monitored. Detector array 30 and beam splitter 31 also must be of sufficient dimensions that detector array 30 will receive the radiation reflected from alignment reflecting assembly 12 over the entire range of possible misalignments of interest.

In FIG. 1 alignment of the incident radiation with the normal 28 to the reflecting plane 32 of the alignment reflecting assembly 12 results in the condition depicted in FIG. 4, with both the radiation reflected from CM 16 and PCM 18 retro-reflected along the incident radiation beam path. The two reflected energies E(CM) and E(PCM) combine to form a relatively large intensity image 38 shown pictorially above detector array 30. The point on detector array 30 receiving the highest image intensity may be arbitrarily selected to refer to as the alignment or calibration point 33.

FIG. 6 depicts device 10 where element 13 has been perturbed and is titled at an angle $\phi$. As demonstrated in FIG. 5, PCM 18 will continue to retro-reflect radiation along the direction of the incident radiation because of its operation as a phase conjugator. CM 16 will reflect radiation at a total angular deviation of twice the incident angle of radiation. Detector array 30 will detect this deviation by a shift in the point of maximum reflected energy from CM 16, called the CM centroid 34. The distance between the calibration point 33 and the CM centroid 34 ($\delta$) is directly proportional to the magnitude of perturbation of element 13 from its alignment orientation.

The combination of the reflected radiation from both CM 16 and PCM 18 will result in interferometric patterns of fringes 35 upon detector array 30. The geometry of these patterns are a function of the optical geometry of device 10 and can be useful in ascertaining alignment conditions. In FIG. 7 the fringe image of concentric circles and an elevation through the center of the fringe image are indicative of the alignment of the CM centroid 34 with calibration point 33, the condition of FIG. 1. In FIG. 9 there is such a great misalignment that the calibration point 33 and the image resulting from the radiation reflected by PCM 18 are totally separated from the centroid 34 and the image resulting from the radiation reflected by CM 16. Where the misalignment is small one possible fringe pattern that may be produced (offset non-circular fringes) is shown in FIG. 8.

Figure 10:
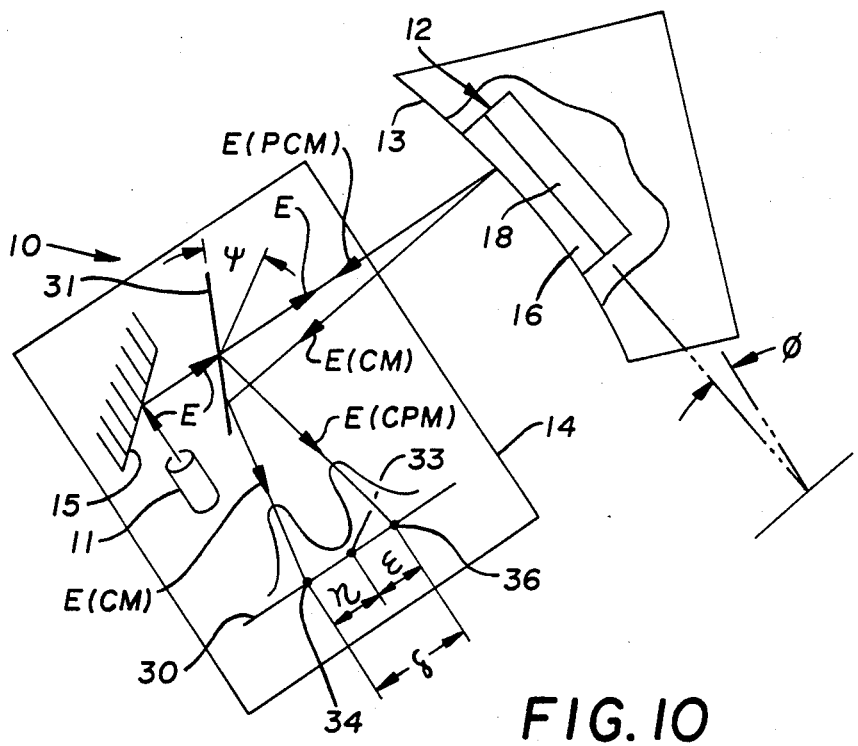
FIG. 10 is a schematic diagram of the exemplary device shown in FIG. 1 in which the monitored element is misalignment by a counterclockwise rotation by an angle of phi degrees ($\phi°$) and the detection assembly is misaligned by a counterclockwise rotation by an angle of psi degrees ($\psi°$).

In FIG. 10 there exists misalignment by both a counterclockwise rotation of the monitored element 13 by an angle of phi degrees ($\phi°$) and a counterclockwise rotation of the detection assembly 14 by an angle psi degrees ($\psi°$). In this instance: the centroid of the energy reflected from PCM 18 is now shifted to PCM centroid 36, a distance $\epsilon$ from the calibration point 33; the energy reflected from CM 16 is still shifted to centroid point 34, a distance $\eta$ from the calibration point 33; and the total distance between centroids must still be $\delta$. Since $\delta$ is still proportional to the misalignment of the monitored element 13, it should be apparent that even a misalignment in the detection assembly 14 does not effect the accuracy or precision by which alignment of element 13 is monitored.

The operation of device 10 is straightforward. Initially element 13 is placed in its alignment position and alignment reflection assembly 12 and detection assembly 14 are adjusted to produced retro-reflection by both CM 16 and PCM 18 (which can be most easily determined from the signal generated by detection assembly 14 by alignment of both CM centroid 34 and PCM centroid 36 at a single calibration point 33 as seen in FIG. 1). Thereafter the alignment orientation of element 13 may be monitored manually or electronically by monitoring either the separation between CM centroid 34 and PCM centroid 36 or fringes 35.

Several significant aspects of the present invention should now be appreciated. First, device 10 will successfully monitor the alignment of element 13 for all radiation patterns, including those having plane wavefronts, spherical wavefronts or wavefronts of more complex geometries. Second, device 10 will function properly with any medium that provides phase conjugation of the selected incident radiation used as PCM 18. Third, the sensitivity of device 10 to alignment variations is readily selectable by careful choice of the initial alignment orientation, the geometric and reflectivity of CM 16 and PCM 18 and the use of centroid and/or fringe pattern schemes for extraction of alignment information.

The next important aspect of the present invention emerges because alignment is monitored as a function of the difference between retro-reflected radiation and conventional reflected radiation: variations in incident radiation patterns occurring dynamically during the monitoring process will not affect the monitoring of the alignment. It is also to be emphasized that the geometry and orientation of CM 16 and PCM 18 may assume any configuration by which the radiation reflection characteristics described hereinabove are obtained.

Inasmuch as the present invention is subject to variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concepts of the present invention, and reasonably equivalent thereto, will accomplish the objects of the present invention and otherwise substantially improve the art of monitoring the alignment of elements with high accuracy and precision.

I claim:

1. A device utilizing radiation for monitoring alignment of elements, comprising:

first element means for reflecting at least a portion of the radiation incident thereupon at a first incident angle, said first element means reflecting the radiation at a first reflection angle different from said first incident angle;

second element means comprising means for phase conjugating the radiation incident thereupon, for reflecting at least a portion of the radiation incident thereupon at a second incident angle, said second element means reflecting the radiation at a second reflection angle substantially equal to said second incident angle; and, detector means for receiving the radiation reflected from said first element means and the radiation reflected from said second element means and generating at least one signal indicative of the alignment of said first element means and said second element means.

2. A device, as set forth in claim 1, wherein said means for phase conjugation is a nonlinear medium.

3. A device, as set forth in claim 1, wherein a reflecting surface of said first element means is positioned proximate to a reflecting surface of said second element means.

4. A device, as set forth in claim 3, wherein said reflecting surface of said first element means is attached to said reflecting surface of said second element means.

5. A device, as set forth in claim 1, wherein said first reflection angle is substantially equal in magnitude and opposite in sign to that of said first incident angle.

6. A device, as set forth in claim 1, wherein said first element means includes a linear medium.

7. A device, as set forth in claim 6, wherein said first element means includes a mirror.

8. A device, as set forth in claim 1, further including a source of radiation.

9. A device, as set forth in claim 8, wherein said source of radiation includes a source of electromagnetic radiation in the optical region of the spectrum.

10. A device, as set forth in claim 9, wherein said source of optical electromagnetic radiation includes a source of light of such nature to permit its phase conjugation by said second element means.

11. A device, as set forth in claim 8, wherein said source of radiation includes a source of electromagnetic radiation in the microwave region of the spectrum.

12. A device, as set forth in claim 11, wherein said source of microwave electromagnetic radiation includes a source of microwave radiation of such nature to permit its phase conjugation by said second element means.

13. A device, as set forth in claim 1, wherein said detector means includes detector array means for detecting a characteristic of said reflected radiation from said first element means and a characteristic of said reflected radiation from said second element means.

14. A device, as set forth in claim 13, wherein said detector means detects an interferometric pattern from said reflected radiation from said first element means and said reflected radiation from said second element means.

15. A device, as set forth in claim 13, wherein said detector means further includes means for directing said reflected radiation from first element means and said reflected radiation from said second element means to said detector array means.

16. A device, as set forth in claim 15, wherein means for directing said reflected radiation from said first element means and said reflected radiation from said second element means to said detector array means includes a beam splitter.

17. A device, as set forth in claim 16, wherein said first element means is a conventional mirror, said second element is a phase conjugate mirror, said conventional mirror and said phase conjugate mirror are affixed together and to a component whose alignment is to be monitored, and further including laser means for generating radiation in the form of coherent light.

18. A device utilizing radiation for monitoring the alignment of elements, comprising:
first element means for reflecting at least a portion of the radiation incident thereupon at a first incident angle, said first element means reflecting the radiation at a first reflection angle substantially equal in magnitude and opposite in sign to that of said first incident angle;
second element means comprising means for phase conjugating the radiation incident thereupon, for reflecting at least a portion of the radiation incident thereupon at a second incident angle, said second element means reflecting the radiation at a second reflection angle back substantially along the path of the radiation incident thereupon; and
detector means for receiving the radiation reflected from said first element means and the radiation reflected from said second element means and generating at least one signal indicative of the alignment of said first element means and said second element means.

19. A device, as set forth in claim 18, wherein said means for phase conjugation is a nonlinear medium.

20. A device, as set forth in claim 18, wherein a reflecting surface of said first element means in positioned proximate to a reflecting surface of said second element means.

21. A device utilizing radiation for monitoring alignment of elements, comprising:
first element means for reflecting at least a portion of the radiation incident thereupon at a first incident angle, said first element means reflecting the radiation at a first reflection angle responsive to the alignment of the elements;
second element means comprising means for phase conjugating the radiation incident thereupon, for reflecting at least a portion of the radiation incident thereupon at a second incident angle, said second element means reflecting the radiation at a second reflection angle nonresponsive to the alignment of the elements; and
detector means for receiving the radiation reflected from said first element means and the radiation reflected from said second element means and generating at least one signal indicative of the alignment of said first element means and said second element means.

22. A device, as set forth in claim 21, wherein said means for phase conjugation is a nonlinear medium.

23. A device, as set forth in claim 21, wherein a reflecting surface of said first element means is positioned proximate to a reflecting surface of said second element means.

24. A method utilizing radiation for monitoring alignment of elements, comprising the steps of:
reflecting at least a portion of the radiation incident upon a first element means at a first reflection angle different from a first incident angle at which the radiation is incident upon said first element means;
reflecting at least a portion of the radiation incident upon a second element means at a second reflection angle substantially equal to a second incident angle at which the radiation is incident upon said second element means by phase conjugating the radiation incident thereupon; and,
determining alignment of said first element means and said second element means from the radiation reflected from said first element means and the radiation reflected from said second element means.

25. A method, as set forth in claim 24, wherein said step of phase conjugating the radiation incident upon said second element means includes the step of reflecting said incident radiation from a nonlinear medium.

26. A method, as set forth in claim 24, comprising the step of positioning a reflecting surface of said first element means proximate to a reflecting surface of said second element means.

27. A method, as set forth in claim 26, wherein said step of positioning a reflecting surface of said first element means proximate to a reflecting surface of said second element means includes the step of attaching said reflecting surface of said first element means to said reflecting surface of said second element means.

28. A method, as set forth in claim 24, wherein said step of reflecting at least a portion of the radiation incident upon said first element means includes the step of reflecting at least portion of said radiation incident upon said first element means at an angle substantially equal in magnitude and opposite in sign to that of said first incident angle.

29. A method, as set forth in claim 24, wherein said step of reflecting at least a portion of the radiation incident upon said first element means includes the step of reflecting at least a portion of said radiation incident upon said first element means from a linear medium.

30. A method, as set forth in claim 29, wherein said step of reflecting at least a portion of the radiation incident upon said first element means from a linear medium includes the step of reflecting at least a portion of said radiation incident upon said first element means from a mirror.

31. A method, as set forth in claim 24, further including the step of generating the radiation.

32. A method, as set forth in claim 31, wherein said step of generating the radiation includes the step of generating electromagnetic radiation in the optical region of the spectrum.

33. A method, as set forth in claim 32, wherein said step of generating electromagnetic radiation in the optical region of the spectrum includes the step of generating light of such nature to permit its phase conjugation by said second element means.

34. A method, as set forth in claim 31, wherein said step of generating the radiation includes the step of generating electromagnetic radiation in the microwave region of the spectrum.

35. A method, as set forth in claim 34, wherein said step of generating electromagnetic radiation in the microwave region of the spectrum includes the step of generating microwave radiation of such nature to permit its phase conjugation by said second element means.

36. A method, as set forth in claim 24, wherein said step of determining alignment includes the step of detecting a characteristic of said reflected radiation from said first element means and a characteristic of said reflected radiation from said second element means.

37. A method, as set forth in claim 36, wherein said step of determining alignment further includes the step of directing said reflected radiation from said first element means and said reflected radiation from said second element means to a detector means.

38. A method, as set forth in claim 36, wherein said step of detecting a characteristic includes the step of detecting an interferometric pattern from said reflected radiation from said first element means and said reflected radiation from said second element means.

* * * * *